United States Patent
Ruan et al.

(10) Patent No.: US 10,296,074 B2
(45) Date of Patent: May 21, 2019

(54) FINE-GRAINED POWER OPTIMIZATION FOR HETEROGENEOUS PARALLEL CONSTRUCTS

(71) Applicant: QUALCOMM Incorporated, San Diego, CA (US)

(72) Inventors: Wenjia Ruan, Santa Clara, CA (US); Han Zhao, Santa Clara, CA (US); Tushar Kumar, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 15/417,605

(22) Filed: Jan. 27, 2017

(65) Prior Publication Data

US 2018/0046238 A1     Feb. 15, 2018

Related U.S. Application Data

(60) Provisional application No. 62/374,165, filed on Aug. 12, 2016.

(51) Int. Cl.
| | |
|---|---|
| *G06F 9/50* | (2006.01) |
| *G06F 1/329* | (2019.01) |
| *G06F 1/28* | (2006.01) |
| *G06F 1/3228* | (2019.01) |
| *G06F 9/48* | (2006.01) |

(52) U.S. Cl.
CPC ............. *G06F 1/329* (2013.01); *G06F 1/28* (2013.01); *G06F 1/3228* (2013.01); *G06F 9/4893* (2013.01); *G06F 9/5094* (2013.01); *Y02D 10/22* (2018.01); *Y02D 10/24* (2018.01)

(58) Field of Classification Search
CPC ....... G06F 1/324; G06F 1/3296; G06F 9/5094
See application file for complete search history.

(56) References Cited

U.S. PATENT DOCUMENTS

| | | | |
|---|---|---|---|
| 2009/0109230 A1* | 4/2009 | Miller | G06F 1/3203 |
| | | | 345/506 |
| 2012/0079235 A1 | 3/2012 | Iyer et al. | |
| 2012/0192200 A1 | 7/2012 | Rao et al. | |

(Continued)

FOREIGN PATENT DOCUMENTS

| | | |
|---|---|---|
| WO | 2014105169 A1 | 7/2014 |
| WO | 2016049095 A1 | 3/2016 |

OTHER PUBLICATIONS

International Search Report and Written Opinion—PCT/US2017/033993—ISA/EPO—dated Aug. 24, 2017.

*Primary Examiner* — Albert Wang
(74) *Attorney, Agent, or Firm* — The Marbury Law Group/Qualcomm

(57) ABSTRACT

Various embodiments provide methods, devices, and non-transitory processor-readable storage media enabling joint goals, such as joint power and performance goals, to be realized on a per heterogeneous processing device basis for heterogeneous parallel computing constructs. Various embodiments may enable assignments of power states for heterogeneous processing devices on a per heterogeneous processing device basis to satisfy an overall goal on the heterogeneous processing construct. Various embodiments may enable dynamic adjustment of power states for heterogeneous processing devices on a per heterogeneous processing device basis.

44 Claims, 8 Drawing Sheets

(56) References Cited

U.S. PATENT DOCUMENTS

| | | |
|---|---|---|
| 2012/0222042 A1 | 8/2012 | Chess et al. |
| 2016/0077871 A1 | 3/2016 | Kaplan et al. |
| 2016/0092274 A1 | 3/2016 | Singh et al. |
| 2016/0179162 A1 | 6/2016 | Eastep et al. |
| 2017/0371719 A1* | 12/2017 | Majumdar ............ G06F 9/5094 |

* cited by examiner

FINE-GRAINED POWER OPTIMIZATION FOR HETEROGENEOUS PARALLEL CONSTRUCTS

RELATED APPLICATIONS

This application claims the benefit of priority to U.S. Provisional Application No. 62/374,165 entitled "Fine-Grained Power Optimization For Heterogeneous Parallel Constructs" filed Aug. 12, 2016, the entire contents of which are hereby incorporated by reference.

BACKGROUND

Heterogeneous computing can be used to split computational work into a plurality of work components distributed for execution over multiple heterogeneous processing devices to reduce processing time and power consumption for the computational work. For example, heterogeneous computing can be used to distribute computational work among one or more central processing units (CPUs), one or more graphics processing units (GPUs), one or more digital signal processors (DSPs), and other types of processors.

In heterogeneous parallel computing constructs, a controller distributes work components to two or more heterogeneous processing devices that run in parallel to reach a common synchronization point at the end of the computational work. Some heterogeneous processing devices can complete the same amount of work in less time than other heterogeneous processing devices. The common synchronization point causes any heterogeneous processing device that finishes its assigned work component before other heterogeneous processing devices to wait until the remaining work components being executed by all the other heterogeneous processing devices are completed.

Often, heterogeneous processing devices can have different power state settings. For example, a heterogeneous processing device can have a performance power state setting that maximizes performance by allowing for a maximum power level during execution. As another example, a heterogeneous processing device can have a power state setting that conserves power by restricting power consumption during execution to a minimum power level. As a further example, a heterogeneous processing device can have an efficient power state setting that maximizes a performance to power ratio during execution.

In current heterogeneous parallel computing constructs a controller can set all heterogeneous processing devices receiving distributed work components to a common power state setting. For example, all heterogeneous processing devices to which work components are distributed can be set to an efficient power state setting by the controller. However, applying the same power state setting to all heterogeneous processing devices can cause one or more heterogeneous processing devices to finish assigned work components before other heterogeneous processing devices, resulting in energy waste and/or higher chances of thermal alarms.

SUMMARY

Various embodiments provide methods, devices, and non-transitory processor-readable storage media enabling joint goals, such as power and performance goals, to be realized on a per heterogeneous processing device basis in heterogeneous parallel computing constructs. Various embodiments may enable assignments of power states for heterogeneous processing devices on a per heterogeneous processing device basis. Various embodiments may enable dynamic adjustment of power states for heterogeneous processing devices on a per heterogeneous processing device basis.

Various embodiments include methods, and computing devices implement such methods, of managing heterogeneous parallel computing. Various embodiments may include determining by a controller a joint goal for a computational work construct, determining, by the controller at runtime for the computational work construct, a construct power state based at least in part on the joint goal in which the construct power state indicates a selected power state for each of a plurality of heterogeneous processing devices, and assigning by the controller to each of the plurality of heterogeneous processing devices the selected power state for that respective one of the plurality of heterogeneous processing devices indicated in the construct power state for execution of work components.

Some embodiments may further include receiving in the controller the computational work construct, in which the computational work construct may include the work components to be distributed for execution by the plurality of heterogeneous processing devices and a work allocation indication for each of the plurality of heterogeneous processing devices.

In some embodiments, determining the construct power state based at least in part on the joint goal may include determining, by the controller at runtime for the computational work construct, two or more possible construct power states based at least in part on a computational history associated with the computational work construct, a first prediction function, and a second prediction function, in which the possible construct power states may indicate predicted power states for each of the plurality of heterogeneous processing devices. In such embodiments, determining the construct power state based at least in part on the joint goal may further include determining a utility for each of the two or more possible construct power states based at least in part on the joint goal, and selecting one of the two or more possible construct power states associated with a maximum determined utility as the construct power state. In such embodiments, the first prediction function may calculate performance improvement and the second prediction function may calculate power improvement.

Some embodiments may further include determining by the controller new selected power states for any of the plurality of heterogeneous processing devices that complete execution of respective assigned work components before all of the work components of the computational work construct are finished executing, and assigning the new selected power states before all of the work components of the computational work construct are finished executing.

In some embodiments, determining by the controller the construct power state based at least in part on the joint goal may include monitoring a progress of each of the plurality of heterogeneous processing devices in executing the computational work construct at a time interval, determining by the controller two or more possible construct power states based at least in part on a first prediction function, a second prediction function, and the progress of each of the plurality of heterogeneous processing devices in executing the computational work construct at the time interval, determining by the controller a utility for each of the two or more possible construct power states based at least in part on the joint goal, and selecting by the controller one of the two or more possible construct power states associated with a maximum determined utility as the construct power state. In such embodiments, the two or more possible power construct states may be further based on a maximum remaining computation time of the plurality of heterogeneous processing devices in executing the computational work construct and a sum of remaining power consumptions of the plurality of heterogeneous processing devices in executing the computational work construct. In such embodiments, the first prediction function may calculate remaining execution time and the second prediction function may calculate predicted power consumption.

In some embodiments, the joint goal may be a power and performance goal comprising a ratio of a performance goal state to a power goal state. In some embodiments, the joint goal may indicate at least one of a power state, a thermal state, a battery state, a memory performance state, and a frequency state. In some embodiments, the computational work construct may indicate a time for executing the computational work construct.

Some embodiments may further include the controller preventing assignment of new work components unrelated to the computational work construct to the plurality of heterogeneous processing devices until all of the work components of the computational work construct are finished executing.

Various embodiments may include a computing device having a controller configured with processor-executable instructions to perform operations of the methods summarized above. Various embodiments may include a computing device having means for performing functions of the methods summarized above. Various embodiments may include non-transitory processor-readable media on which are stored processor-executable instructions configured to cause a controller of a computing device to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
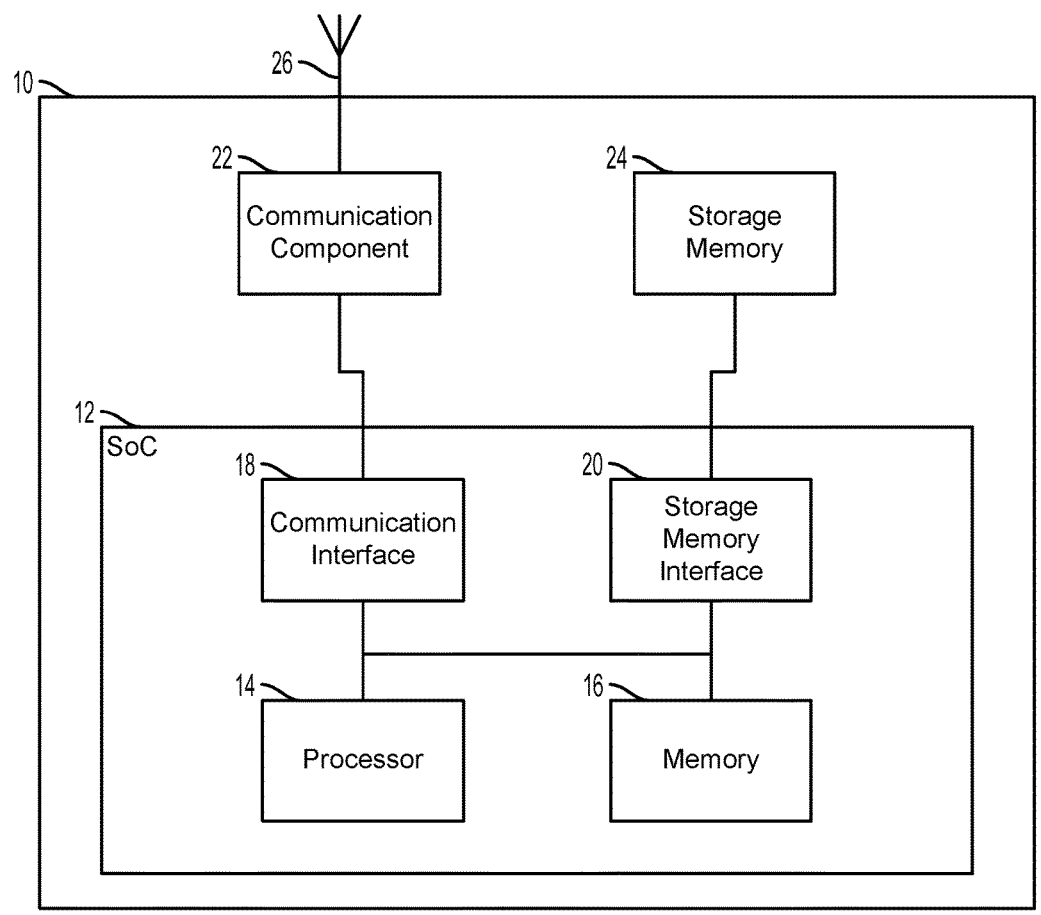
FIG. 1 is a component block diagram illustrating a computing device suitable for implementing an embodiment.

Various embodiments and implementations will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Various embodiments provide methods, devices, and non-transitory processor-readable storage media enabling joint goals, such as power and performance goals, to be realized on a per heterogeneous processing device basis in heterogeneous parallel computing constructs. As used herein the terms "joint goal" and "joint goals" refer to goals relating two or more goals to one another, such as any two or more of power goals, performance goals, thermal goals, etc. While joint goals are often discussed herein in relation to performance goals and power goals, these are merely example goals, and joint goals need not necessarily include performance goals or power goals or be limited to just two goals. For example, a joint goal may relate a performance goal and a thermal goal, a power goal and a thermal goal, a thermal goal and another type goal, a performance goal and another type goal, a power goal and another type goal, etc.

Various embodiments may enable assignments of power states for heterogeneous processing devices on a per heterogeneous processing device basis. Various embodiments may enable dynamic adjustment of power states for heterogeneous processing devices on a per heterogeneous processing device basis. The heterogeneous processing devices may be located on the same chip, such as different cores of a processor. The heterogeneous processing devices may be located in the same device, such as a CPU and GPU of a computing device. The heterogeneous processing devices may be located in different devices, such as CPUs of different computing devices networked together in a message passing interface (MPI) distributed environment. In various embodiments, the assignment of selected power states may be performed by a construct controller that receives a computational work construct from a general scheduling controller.

In various embodiments, a general scheduling controller may define a computational work construct. In various embodiments, a computational work construct may be split into work components, and the work components may be distributed to a plurality of heterogeneous processing devices for execution. As used herein, the term "computational work construct" may refer to a collection of one or more work components that are related by requirements that: 1) the computational work construct may not be considered to be completed until all of the work components are individually completed; and/or 2) any heterogeneous processing device executing a work component may not be assigned new work components unrelated to the computational work construct until all the work components of the computational work construct are finished executing. Thus, in a computational work construct, all parallel threads or kernels of work launched for the computational work construct may have to be completed before the computational work construct is complete. In this manner, the slowest executing work component may dictate the total computational work construct execution time. Additionally, in a computational work construct, heterogeneous processing devices running threads or kernels of work for the computational work construct may not become available to run threads or kernels of work unrelated to the computational work construct until the computational work construct is complete across all assigned heterogeneous processing devices. In particular, the execution of unrelated work threads or kernels may be prevented by the construct controller to ensure that the computational work construct's joint goal may be achieved reliably without external interference from the execution of unrelated work threads or kernels.

In various embodiments, a general scheduling controller may select which heterogeneous processing devices are to be used to execute the work components. In various embodiments, a general scheduling controller may determine a work allocation among the selected plurality of heterogeneous processing devices and indicate the work allocation in the computational work construct. For example, a computational work construct may indicate that fractions of the work components to be split across the selected plurality of heterogeneous processing devices (e.g., 20% to a CPU, 30% to a GPU, etc.) as an indication of the work allocation. As another example, a computational work construct may map specific work components of the computational work construct to specific ones of the selected plurality of heterogeneous processing devices as an indication of the work allocation. In various embodiments, a computational work construct may indicate a time for executing the computational work construct. In various embodiments, the general scheduling controller may send a computational work construct to a construct controller, such as a computational work construct indicating a plurality of heterogeneous processing devices for execution of the work components, a work allocation indication, and/or a time for executing the computational work construct indication, and the construct controller may receive the computational work construct.

In various embodiments, computational work constructs may be associated with power and performance goals for controlling execution of the work components. The way that a joint goal (or goals), such as a power goal and a performance goal (or goals), are established for a computational work construct may vary in various embodiments. In some embodiments, the joint goal (or goals), such as the power and performance goals, for a computational work construct may be constant for a computational work construct or may change with each iteration of the computational work construct. In some embodiments, joint goals, such as power and performance goals, may be pre-determined settings, such as settings stored in a memory available to a construct controller, settings hard coded into software executed by the construct controller, etc. In some embodiments, joint goals may be dynamic settings determined by a user of a device. In some embodiments, joint goals may be hybrid settings partially set by a user of a device and partially pre-determined. In various embodiments, joint goals, such as power and performance goals, may indicate one or more of a power state, a performance state, a thermal state, a battery state, a memory performance state, and a frequency state goal for computational work constructs. In various embodiments, a joint goal, such as a power and performance goal, for a computational work construct may be picked by a construct controller at runtime for a computational work construct based on one or more various factors, such as attributes of the computational work construct, attributes of the heterogeneous processing devices, etc.

In various embodiments, a joint goal for a computational work construct may be a ratio of two states, such as a ratio of a performance state to a power state. A joint goal may be a two value ratio, such as "X:Y". For example, the first term, such as "X", may indicate a percentage of performance improvement authorized to be exchanged for the second term, such as "Y", in percentage power. As a specific example, the joint goal ratio "20:30" may indicate that a trade-off of twenty percent increase in performance against a thirty percent power loss is acceptable for a computational work construct, or vice versa. In various embodiments, additional goals/states may be included in the joint goal, and additional values may be added to the ratio for each additional state. Examples of such additional goals/states include one or more of a thermal state, a battery state, a memory performance state, and a frequency state. For example, a joint goal indicating a performance state, a power state, and a thermal state may be a three value ratio, such as in the form of "X:Y:Z".

In various embodiments, joint goals, such as power and performance goals, may be tailored to achieve different power objectives by adjusting the values of the ratios. In various embodiments, a user may specify that currently certain goals/states are not of interest, and such non-interested goals/states may be discounted from the determination of a device's power states. For example, the goal of maximizing performance regardless of power may be expressed as X:* in a joint goal, where X indicates the performance state and * indicates that another goal/state, such as the power state, is of no interest.

In various embodiments, at runtime for a computational work construct, a construct controller may determine a construct power state based at least in part on a joint goal, such as a power and performance goal. For example, an application programming interface (API) running on the construct controller may determine a construct power state based at least in part on a power and performance goal. In various embodiments, the construct power state may indicate a selected power state for each of a plurality of heterogeneous processing devices. In various embodiments, the heterogeneous processing devices may be assigned their respective selected power states indicated in the construct power state for execution of their respective work components. In this manner, each heterogeneous processing device executing its respective work component may be individually set to its own respective selected power state such that the overall execution of the computational work construct meets the joint goal, such as the power and performance goal.

In some embodiments, the construct power state may be determined by proactive prediction. The construct power state may be based on information from the last time the computational work construct was run. As some computational work constructs are run repeatedly, a construct controller may track each invocation of a computational work construct and generate a computational history associated with the computational work construct. For example, the computational history may track the construct power state, execution time, and power consumption for each invocation of the computational work construct. At runtime of the current computational work construct, the construct controller may determine one or more possible construct power states for the computational work construct based on one or more prediction function and the computational history. For example, based on a first prediction function that calculates performance improvement, a second prediction function that calculates power improvement, and the computational history, the construct controller may determine two or more possible construct power states. In various embodiments, the one or more prediction functions may be any type of functions, such as linear functions, non-linear functions, machine learning functions, etc. The construct controller may determine a utility for each determined possible construct power state based on the joint goal, such as a joint power and performance goal, and select the possible power construct with the maximum determined utility as the construct power state for execution of the current computational work construct.

In some embodiments, the construct power state may be determined by progress monitoring. The construct power state may be adjusted continually during each execution of the computational work construct by monitoring the progress of execution. The construct controller may monitor the progress of each heterogeneous processing device in executing the computational work construct at a time interval. Based on the progress of each heterogeneous processing device, the construct controller may linearly extrapolate the remaining computation time and remaining power consumption for each heterogeneous processing device at the current power state configuration.

The construct controller may determine one or more possible construct power states for the computational work construct based on one or more prediction functions and the progress of each heterogeneous processing device. For example, based on a first prediction function that calculates remaining execution time, a second prediction function that calculates predicted remaining power consumption, and the progress of each heterogeneous processing device at the time interval, the construct controller may determine two or more possible construct power states. The two or more possible construct power states may be controlled by the overall remaining execution time that is the maximum remaining execution time of the slowest heterogeneous processing device and the remaining power consumption that is the sum of the power consumptions for the heterogeneous processing devices. In various embodiments, the one or more prediction functions may be any type of functions, such as linear functions, non-linear functions, machine learning functions, etc.

The construct controller may determine a utility for each determined possible construct power state based on the joint goal, such as a power and performance goal, and select the possible power construct with the maximum determined utility as the construct power state for execution of the current computational work construct.

FIG. 1 illustrates a system including a computing device 10 suitable for use with the various embodiments. The computing device 10 may include a system-on-chip (SoC) 12 with a processor 14, a memory 16, a communication interface 18, and a storage memory interface 20. The computing device 10 may further include a communication component 22 such as a wired or wireless modem, a storage memory 24, an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multi-core processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
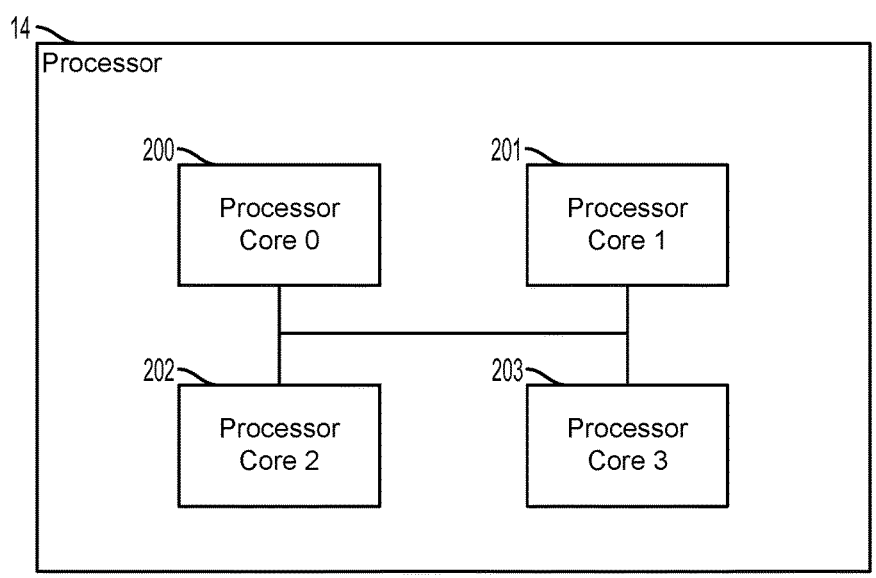
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big-.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and are not intended to limit the various embodiments to a four-core processor system. The computing device 10, the SoC 12, or the multi-core processor 14 may individually or in combination include fewer or more than the four processor cores 200, 201, 202, 203 illustrated and described herein.

Figure 3A:
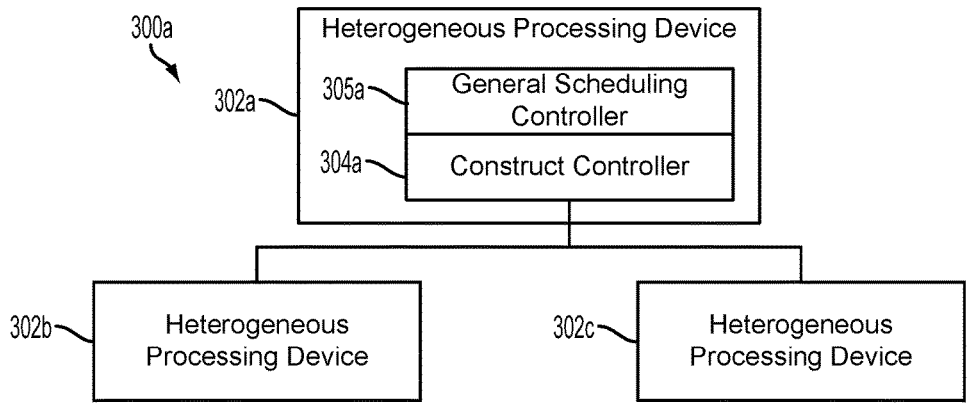
FIGS. 3A-3C are component block diagrams illustrating three examples of a heterogeneous parallel computing system suitable for implementing various embodiments.
Figure 3B:
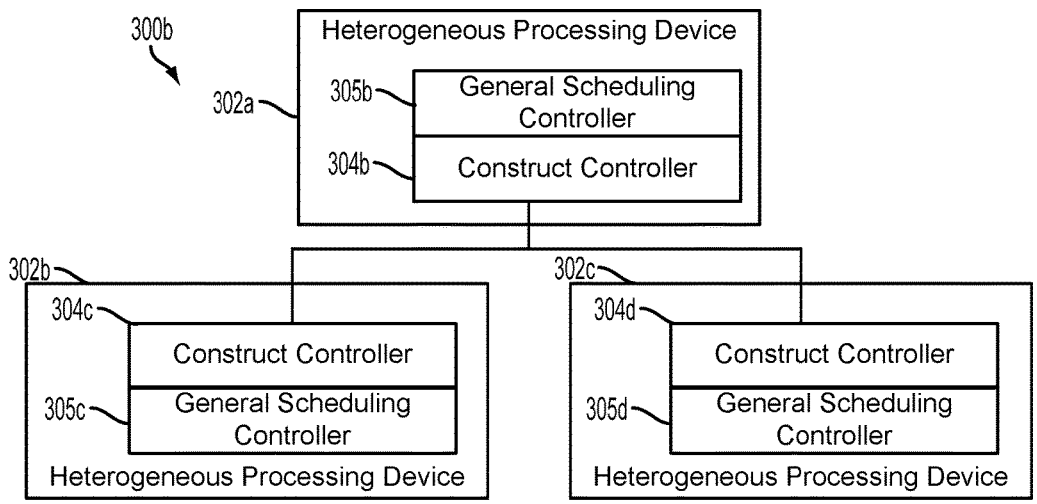
Figure 3C:
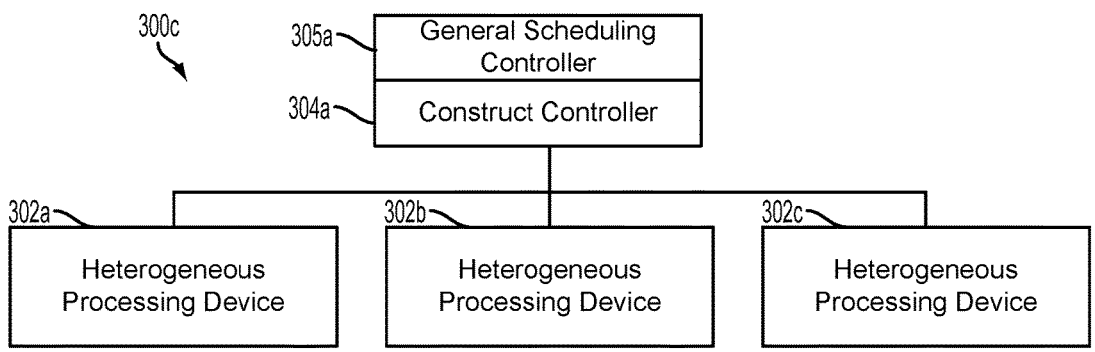

FIGS. 3A, 3B, and 3C illustrate example embodiments of a heterogeneous parallel computing system 300a-300c. In various embodiments, a heterogeneous parallel computing system 300a-300c may include a central controller architecture, distributed controller architecture, or a combination of central and distributed controller architectures. In various embodiments, central and distributed controller architectures may include one or more general scheduling controllers 304a, 305b, 305c, 305d, and one or more construct controllers 304a, 304b, 304c, 304d, in communication with one another. In various embodiments, any of the central and distributed controller architectures, may be included as integrated hardware components of an SoC (e.g., SoC 12 of FIG. 1) or a processing device (e.g., processor 14 of FIGS. 1 and 2), standalone hardware components of a computing device (e.g., computing device 10 of FIG. 1), or program components (e.g., software or firmware) that may be executed by a processing device.

The example heterogeneous parallel computing systems 300a, 300b, 300c, illustrated in FIGS. 3A-3C may heterogeneous processing devices 302a, 302b, 302c, which may include any of the general or specialized processing devices described herein (e.g., processor 14 of FIGS. 1 and 2), and at least one of the heterogeneous processing devices 302a, 302b, 302c, may be configured differently from the other heterogeneous processing devices 302a, 302b, 302c. For example, the heterogeneous processing device 302a may be a CPU, while the other heterogeneous processing devices 302b, 302c, may be an accelerator such as a GPU, a DSP, and/or an APU. Another example may include heterogeneous processing devices 302a, 302b, 302c, of the same type, such as multiple CPUs, with various configurations, including different instruction set architecture, pipelines, operating frequencies, etc.

In various embodiments, such as the examples illustrated in FIGS. 3A and 3C, a centralized general scheduling controller 305a may be communicatively connected to a centralized construct controller 304a. The centralized general scheduling controller 305a may be configured to define a computational work construct. The centralized general scheduling controller 305a may be configured to select the heterogeneous processing devices 302a, 302b, 302c that are to be used to execute the work components. For example, the centralized general scheduling controller 305a may select or assign one or more of the heterogeneous processing devices 302a, 302b, and 302c to execute the work components of a computational work construct. In this manner, the centralized general scheduling controller 305a may designate that only the selected one or more of the heterogeneous processing devices 302a, 302b, and/or 302c may be used to execute the work components of a computational work construct. In various embodiments, the centralized general scheduling controller 305a may be configured to provide load balancing between various computational work constructs and may select the one or more of the heterogeneous processing devices 302a, 302b, and/or 302c to meet one or more load balancing goals.

In various embodiments, the centralized general scheduling controller 305a may be configured to determine a work allocation among the plurality of heterogeneous processing devices 302a, 302b, and/or 302c selected to execute the work components of a computational work construct and may indicate the work allocation in the computational work construct. For example, a computational work construct may indicate that fractions of the work components to be split across the selected plurality of heterogeneous processing devices 302a, 302b, and/or 302c, (e.g., 40% to 302a, 25% to a 302b, and 35% to 302c) as an indication of the work allocation. As another example, a computational work construct may map specific work components of the computational work construct to specific ones of the selected plurality of heterogeneous processing devices 302a, 302b, and/or 302c as an indication of the work allocation. In various embodiments, the centralized general scheduling controller 305a may be configured to determine a time for executing a computational work construct and the computational work construct may indicate the time for executing the computational work construct.

In various embodiments, the centralized general scheduling controller 305a may send a computational work construct to a centralized construct controller 304a, such as a computational work construct indicating a plurality of heterogeneous processing devices 302a, 302b, and/or 302c for execution of the work components, and/or a work allocation indication, and the centralized construct controller 304a may receive the computational work construct.

In various embodiments, such as the examples illustrated in FIGS. 3A and 3C, a centralized construct controller 304a may be communicatively connected to the multiple heterogeneous processing devices 302a, 302b, 302c. The centralized construct controller 304a may be configured to assign selected power states and work components for execution by any of the heterogeneous processing devices 302a, 302b, 302c. The centralized construct controller 304a may be configured to determine a construct power state based at least in part on a joint goal, such as a joint power and performance goal. The centralized construct controller 304a may determine the construct power state by proactive prediction and/or progress monitoring of the heterogeneous processing devices 302a, 302b, 302c.

The example heterogeneous parallel computing system 300a illustrated in FIG. 3A may include the centralized general scheduling controller 305a and/or the centralized controller 304a as an incorporated hardware component of one of multiple heterogeneous processing devices 302a, 302b, 302c, heterogeneous processing device 302a in this example. The example heterogeneous parallel computing system 300c illustrated in FIG. 3C may include the centralized general scheduling controller 305a and/or the centralized controller 304a as incorporated hardware component of a SoC or standalone hardware component of a computing device.

In various embodiments, such as the example illustrated in FIG. 3B, distributed general scheduling controllers 305b, 305c, 305d and/or distributed construct controllers 304b, 304c, 304d, may be communicatively connected to another of the distributed general scheduling controllers 305b, 305c, 305d and/or construct controllers 304b, 304c, 304d. In various embodiments, one or more of distributed general scheduling controllers 305b, 305c, 305d, and/or one or more of distributed construct controllers 304b, 304c, 304d, may be communicatively connected to a centralized controller 304a. The distributed construct controllers 304b, 304c, 304d, may also be communicatively connected to an associated heterogeneous processing device 302a, 302b, 302c.

The distributed general scheduling controllers 305b, 305c, 305d may be configured to define a computational work construct. The distributed general scheduling controllers 305b, 305c, 305d may be configured to select the heterogeneous processing devices 302a, 302b, 302c that are to be used to execute the work components. For example, the distributed general scheduling controllers 305b, 305c, 305d may select or assign one or more of the heterogeneous processing devices 302a, 302b, and 302c to execute the work components of a computational work construct. In this manner, the distributed general scheduling controllers 305b, 305c, 305d may designate that only the selected one or more of the heterogeneous processing devices 302a, 302b, and/or 302c may be used to execute the work components of a computational work construct. In various embodiments, the distributed general scheduling controllers 305b, 305c, 305d may be configured to provide load balancing between various computational work constructs and may select the one or more of the heterogeneous processing devices 302a, 302b, and/or 302c to meet one or more load balancing goals.

In various embodiments, the distributed general scheduling controllers 305b, 305c, 305d may be configured to determine a work allocation among the plurality of heterogeneous processing devices 302a, 302b, and/or 302c selected to execute the work components of a computational work construct and may indicate the work allocation in the computational work construct. For example, a computational work construct may indicate that fractions of the work components to be split across the selected plurality of heterogeneous processing devices 302a, 302b, and/or 302c, (e.g., 40% to 302a, 25% to a 302b, and 35% to 302c) as an indication of the work allocation. As another example, a computational work construct may map specific work components of the computational work construct to specific ones of the selected plurality of heterogeneous processing devices 302a, 302b, and/or 302c as an indication of the work allocation. In various embodiments, the distributed general scheduling controllers 305b, 305c, 305d may be configured to determine a time for executing a computational work construct and the computational work construct may indicate the time for executing the computational work construct.

In various embodiments, the distributed general scheduling controllers 305b, 305c, 305d may send a computational work construct to distributed construct controllers 304b, 304c, 304d, such as a computational work construct indicating a plurality of heterogeneous processing devices 302a, 302b, and/or 302c for execution of the work components, and/or a work allocation indication, and the distributed construct controllers 304b, 304c, 304d may receive the computational work construct.

The distributed construct controllers 304b, 304c, 304d may be configured to assign selected power states and work components for execution by any of the heterogeneous processing devices 302a, 302b, 302c via their associated distributed construct controllers 304b, 304c, 304d. The distributed construct controllers 304b, 304c, 304d may be configured to determine a construct power state based at least in part on a joint goal, such as a joint power and performance goal. The distributed construct controllers 304b, 304c, 304d may determine the construct power state by proactive prediction and/or progress monitoring of the heterogeneous processing devices 302a, 302b, 302c via their associated distributed construct controllers 304b, 304c, 304d.

The example heterogeneous parallel computing system 300b illustrated in FIG. 3B may include the distributed general scheduling controllers 305b, 305c, 305d and/or distributed construct controllers 304b, 304c, 304d, as incorporated hardware components of multiple heterogeneous processing devices 302a, 302b, 302c. In this example, the distributed general scheduling controllers 305b and distributed construct controller 304b may be associated with the heterogeneous processing devices 302a, the distributed general scheduling controllers 305c and distributed construct controller 304c may be associated with the heterogeneous processing devices 302b, and the distributed general scheduling controllers 305d and distributed construct controller 304d may be associated with the heterogeneous processing devices 302c.

The number and combinations of controllers and processing devices are not limited to the examples illustrated in FIGS. 3A-3C. Any number and combination of controllers and processing devices may be used to configure a heterogeneous parallel computing system, including any combination of centralized and/or distributed controllers. Such combinations may also include combinations of controllers as integrated hardware components, standalone hardware components, and/or program components.

Figure 4:
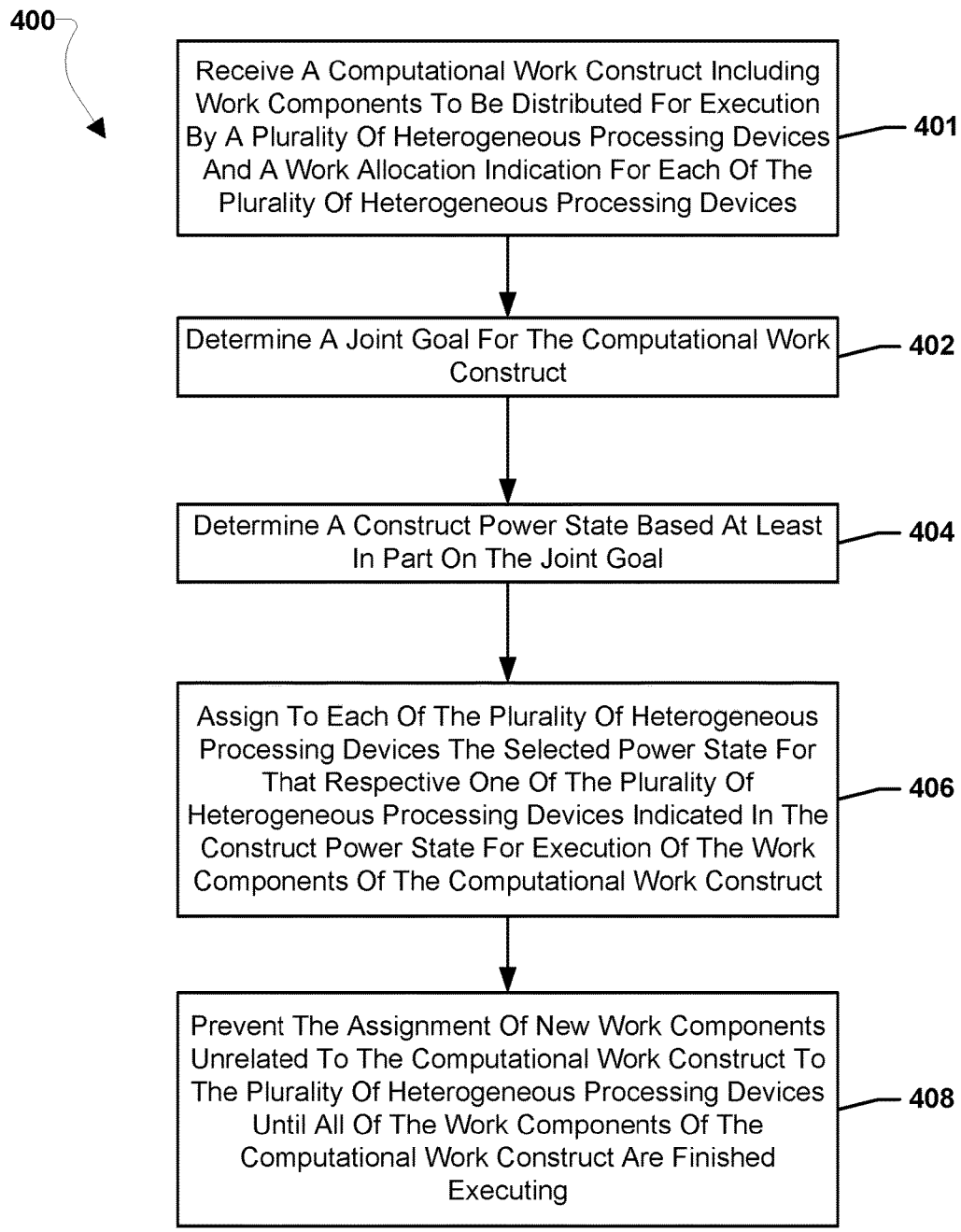
FIG. 4 is a process flow diagram illustrating a method for heterogeneous parallel computing according to an embodiment.

FIG. 4 illustrates a method 400 for heterogeneous parallel computing according to an embodiment. The method 400 may be implemented in a computing device in software executing in a processor (e.g., the processor 14 in FIGS. 1 and 2), in general purpose hardware, in dedicated hardware (e.g., the construct controller 304a, 304b, 304c, 304d, in FIGS. 3A-3C), or in a combination of a processor and dedicated hardware, such as a processor executing software within a heterogeneous parallel computing system that includes other individual components. In order to encompass the alternative configurations enabled in the various embodiments, the hardware implementing the method 400 is referred to herein as a "controller."

In block 401, the controller may receive a computational work construct including work components to be distributed for execution by a plurality of heterogeneous processing devices and a work allocation indication for each of the plurality of heterogeneous processing devices. For example, a computational work construct including work components to be distributed for execution by a plurality of heterogeneous processing devices and a work allocation indication for each of the plurality of heterogeneous processing devices may be sent from a general scheduling controller (e.g., general scheduling controller 305a, 305b, 305c, 305d in FIGS. 3A-3C) and received by a construct controller (e.g., the construct controller 304a, 304b, 304c, 304d, in FIGS. 3A-3C). In various embodiments, the computational work construct may be a collection of work components that may be related by requirements that: 1) the computational work construct may not be considered to be completed until all of the work components are individually completed; and 2) any heterogeneous processing device executing a work component may not be assigned new work components unrelated to the computational work construct until all of the work components of the computational work construct are finished executing. Thus, all parallel threads or kernels of work launched for the computational work construct may have to be completed before the computational work construct is complete. In this manner, the slowest executing work component may dictate the total computational work construct execution time. In various embodiments, the plurality of heterogeneous processing devices that are to be used to execute the work construct may be pre-selected, such as by a general scheduling controller (e.g., general scheduling controller 305a, 305b, 305c, 305d in FIGS. 3A-3C), and those pre-selected heterogeneous processing devices may be the plurality of heterogeneous processing devices indicated in the work construct. In various embodiments, the work allocation among the selected plurality of heterogeneous processing devices may be pre-determined, such as by a general scheduling controller (e.g., general scheduling controller 305a, 305b, 305c, 305d in FIGS. 3A-3C), and the pre-determined work allocation may be indicated in the computational work construct. For example, a computational work construct may indicate that fractions of the work components to be split across the selected plurality of heterogeneous processing devices (e.g., 20% to a CPU, 30% to a GPU, etc.) as an indication of the work allocation. As another example, a computational work construct may map specific work components of the computational work construct to specific ones of the selected plurality of heterogeneous processing devices as an indication of the work allocation. In various embodiments, a computational work construct may indicate a time for executing the computational work construct.

In block 402, the controller may determine a joint goal for the computational work construct. For example, the controller may determine a joint power and performance goal for a computational work construct including work components to be distributed for execution by a plurality of heterogeneous processing devices. The joint goal for a computational work construct may be constant for a computational work construct or may change with each iteration of the computational work construct. In some embodiments, joint goals may be pre-determined settings, such as settings stored in a memory available to the controller, settings hard coded into software executed by the controller, etc. In such embodiments, determining a joint goal may include loading the pre-determined settings. In some embodiments, joint goals may be dynamic settings determined by a user of a device. In such embodiments, determining a joint goal may include receiving the setting indications from the user of the computing device. In some embodiments, joint goals may be hybrid settings partially set by a user of the computing device and partially pre-determined.

In various embodiments, joint goals, such as joint power and performance goals, may indicate one or more of a power state, a performance state, a thermal state, a battery state, a memory performance state, and a frequency state goal for computational work constructs. In various embodiments, a joint goal, such as a power and performance goal, for a construct may be picked by the controller at runtime for a computational work construct based on one or more various factors, such as attributes of the computational work construct, attributes of the heterogeneous processing devices, etc.

In various embodiments, a joint goal may be a ratio of a performance state to a power state. For example, a joint goal may be a two value ratio, such as "X:Y". For the example of a joint power and performance goal, the first term, such as "X", may indicate a percentage of performance improvement authorized to be exchanged for the second term, such as "Y", in percentage power. As a specific example, the ratio "20:30" may indicate that a trade-off of twenty percent increase in performance against a thirty percent power loss is acceptable for a computational work construct. In various embodiments, additional goals/states, such as one or more of a thermal state, a battery state, a memory performance state, and a frequency state, may be included in the joint goal, and additional values may be added to the ratio for each additional goal/state. For example, a joint goal indicating a performance state, a power state, and a thermal state may be a three value ratio, such as "X:Y:Z". In various embodiments, joint goals, such as power and performance goals, may be tailored to achieve different power objectives by adjusting the values of the ratios. In various embodiments, a user may specify that currently certain goals/states are not of interest, and these non-interested goals/states may be discounted from the determination of a device's power states. For example, the goal of maximizing performance regardless of power may be expressed as X:* in a joint goal, where X indicates the performance state and * indicates that another goal/state, such as the power state is on no interest.

In block 404, the controller may determine a construct power state (G) based at least in part on the joint goal. For example, the controller may determine a construct power state (G) based at least in part on the power and performance goal. In various embodiments, the operations of block 404 to determine the construct power state (G) may be performed at runtime for the computational work construct. In various embodiments, the construct power state (G) may indicate a selected power state (g) for each of the plurality of heterogeneous processing devices. For example, the construct power state (G) may indicate the selected power state for a CPU ($g_{CPU}$) and the selected power state for a GPU ($g_{GPU}$) as an array "G=[$g_{CPU}$, $g_{GPU}$]". As another example, the construct power state (G) may indicate the selected power state for a plurality of heterogeneous processing devices ($D_1$, $D_2$, . . . $D_n$) as an array "G=[$g_1$, $g_2$, . . . $g_n$]". In various embodiments, the controller may determine the construct power state (G) by proactive prediction and/or progress monitoring of the heterogeneous processing devices.

In block 406, the controller may assign to each of the plurality of heterogeneous processing devices the selected power state for the respective one of the plurality of heterogeneous processing devices indicated in the construct power state for execution of the work components. In this manner, the selected power state for each heterogeneous processing device may be assigned on a per heterogeneous processing device basis and the overall execution of the computational work construct may meet the joint goal, such as the joint power and performance goal.

In block 408, the controller may prevent the assignment of new work components unrelated to the computational work construct to the plurality of heterogeneous processing devices until all of the work components of the computational work construct are finished executing. In this manner, the controller may prevent heterogeneous processing devices running threads or kernels of work for the computational work construct from becoming available to run threads or kernels of work unrelated to the computational work construct until the computational work construct is complete across all assigned heterogeneous processing devices.

Figure 5:
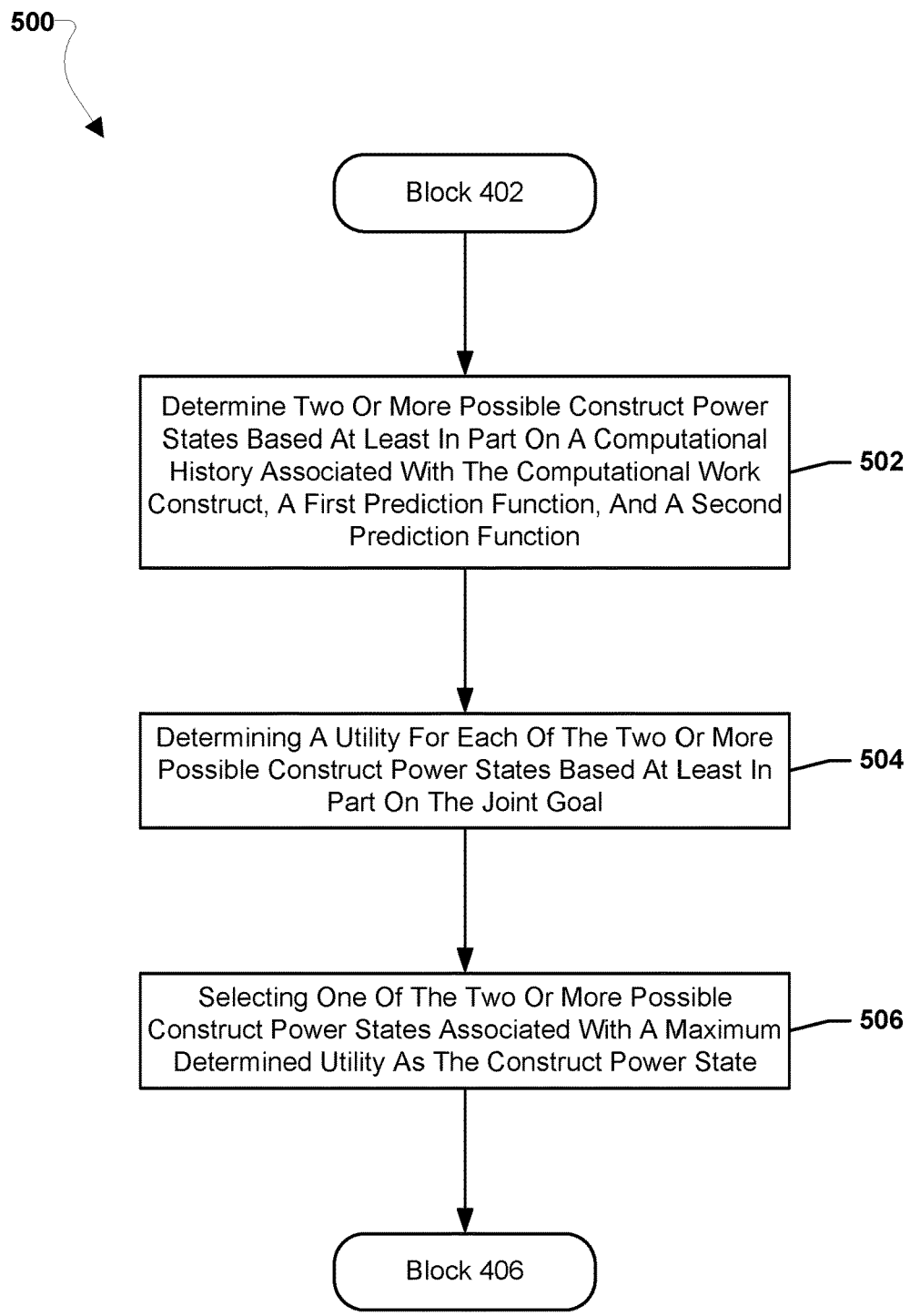
FIG. 5 is a process flow diagram illustrating a method for determining a construct power state based at least in part on a joint goal according to an embodiment.

FIG. 5 illustrates a method 500 for determining a construct power state based at least in part on a joint goal, such as a joint power and performance goal, according to an embodiment. The method 500 may enable proactive prediction of a construct power state (G). The method 500 may be implemented in a computing device in software executing in a processor (e.g., the processor 14 in FIGS. 1 and 2), in general purpose hardware, in dedicated hardware (e.g., the construct controller 304a, 304b, 304c, 304d, in FIGS. 3A-3C), or in a combination of a processor and dedicated hardware, such as a processor executing software within a heterogeneous parallel computing system that includes other individual components. In order to encompass the alternative configurations enabled in the various embodiments, the hardware implementing the method 500 is referred to herein as a "controller."

The operations of the method 500 implement some embodiments of the operations performed in block 404 of the method 400 of FIG. 4. Thus, with reference to FIGS. 1-5, the controller may begin performing operations of the method 500 in response to determining a joint goal, such as a joint power and performance goal, for a computational work construct including work components to be distributed for execution by a plurality of heterogeneous processing devices in block 402 of the method 400.

In block 502, the controller may determine two or more possible construct power states (G') based at least in part on a computational history (H) associated with the computational work construct, a first prediction function ($\alpha$), and a second prediction function ($\beta$). In various embodiments, the operations of block 502 to determine the two or more possible construct power states (G') may be performed at runtime for the computational work construct.

As some computational work constructs are run repeatedly, the controller may track each invocation of a computational work construct and generate a computational history (H) associated with the computational work construct. For example, the computational history may track the construct power state (G), execution time (T), and power consumption (P) for each invocation of the computational work construct. For example, the construct power state (G) may indicate the power state for a CPU ($g_{CPU}$) and the power state for a GPU ($g_{GPU}$) used to execute the work construct as an array "G=[$g_{CPU}$, $g_{GPU}$]", the execution time (T) may indicate the execution time for a CPU ($t_{CPU}$) and the execution time for a GPU ($t_{GPU}$) used to execute the work construct as an array "T=[$t_{CPU}$, $t_{GPU}$]", and the power consumption (P) may indicate the power consumption for a CPU ($p_{CPU}$) and the power consumption for a GPU ($p_{GPU}$) used to execute the work construct as an array "P=[$p_{CPU}$, $p_{GPU}$]". The computational history (H) may track the repeated invocations of the work construct, for example in an array "H={($G_1$, $T_1$, $P_1$), ($G_2$, $T_2$, $P_2$), . . . ($G_n$, $T_n$, $P_n$)}". The computational history (H) may include the current power states, execution times, and power consumptions for the plurality of heterogeneous processing devices.

The first prediction function ($\alpha$) and the second prediction function ($\beta$) may be any type of functions, such as linear functions, non-linear functions, machine learning functions, etc. For example, the first prediction function ($\alpha$) may calculate a performance improvement ($t'_{CPU}$) for the CPU based on inputs of the current power state ($g_{CPU}$), current execution time ($t_{CPU}$), and a possible power state ($g'_{CPU}$) as follows:

$$\alpha_{CPU}(g_{CPU}, t_{CPU}, g'_{CPU}) \rightarrow t'_{CPU}.$$

The second prediction function ($\beta$) may calculate power improvement. For example, the second prediction function ($\beta$) may calculate a power improvement ($p'_{GPU}$) for the CPU based on inputs of the current power state ($g_{CPU}$), current power consumption ($p_{CPU}$), and a possible power state ($g'_{CPU}$) as follows:

$$\beta_{CPU}(g_{CPU}, p_{CPU}, g'_{CPU}) \rightarrow p'_{CPU}.$$

The possible power states for each of the heterogeneous processing devices may be combined to form a possible construct power state (G').

In block 504, the controller may determine a utility for each of the two or more possible construct power states (G') based at least in part on the joint goal, such as a joint power and performance goal. For the example of a joint power and performance goal, the utility (U) for a possible construct power state (G') may be found based on the performance improvement (Perf Improvement), the power improvement (Power Improvement), and the power and performance goal (X:Y) as follows:

$$U(G, G') = \frac{\text{Perf Improvement}}{X} + \frac{\text{Power Improvement}}{Y}.$$

In block 506, the controller may select one of the two or more possible construct power states associated with a maximum determined utility as the construct power state. In response to selecting the construct power state, the controller may return to performing the operations of block 406 of the method 400 (FIG. 4).

Figure 6:
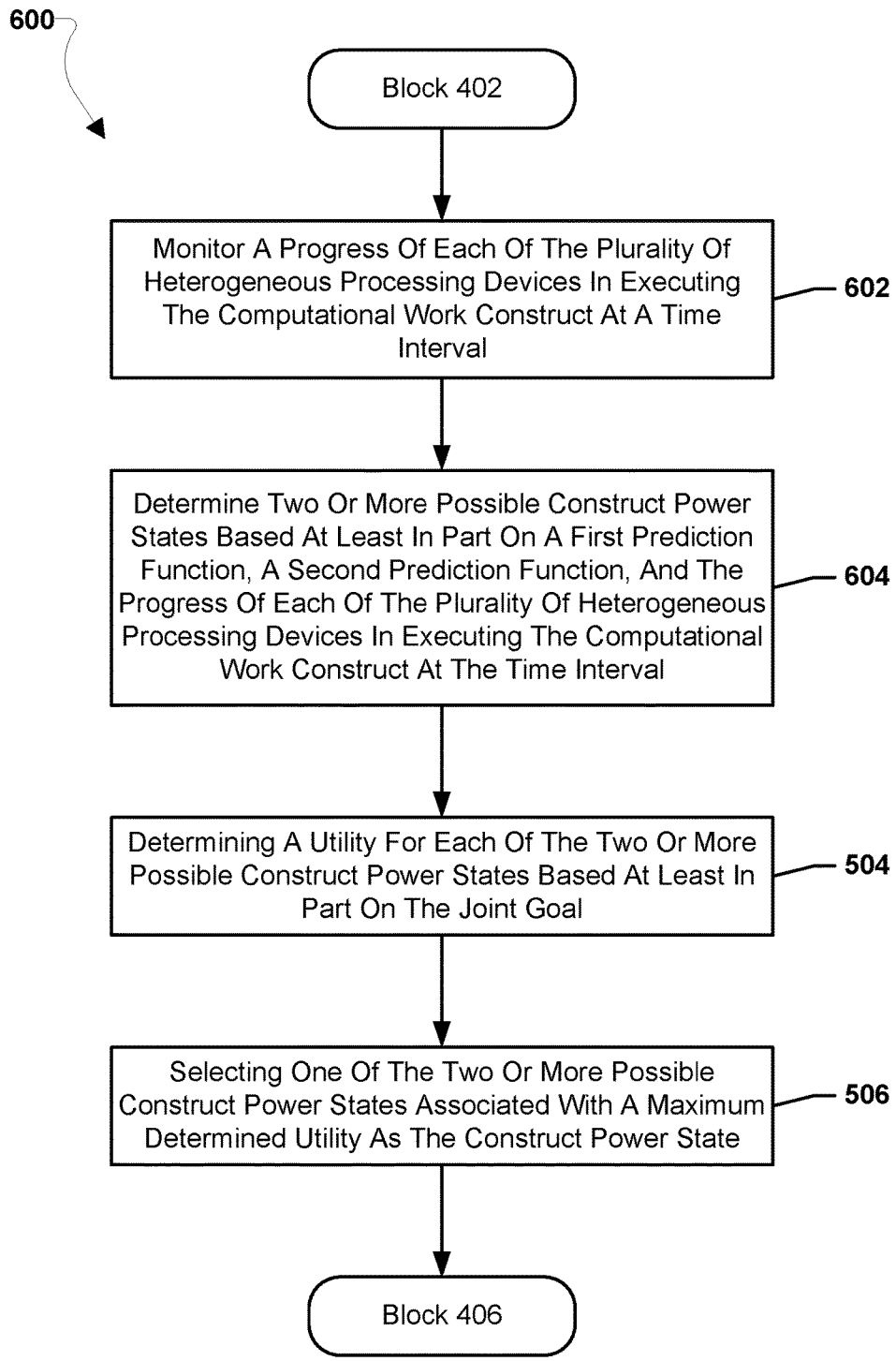
FIG. 6 is a process flow diagram illustrating another method for determining a construct power state based at least in part on a joint goal according to an embodiment.

FIG. 6 illustrates a method 600 for determining a construct power state based at least in part on a joint goal, such as a joint power and performance goal, according to an embodiment. The method 600 may enable progress monitoring based control of construct power states (G). The method 600 may be implemented in a computing device in software executing in a processor (e.g., the processor 14 in FIGS. 1 and 2), in general purpose hardware, in dedicated hardware (e.g., the construct controller 304a, 304b, 304c, 304d, in FIGS. 3A-3C), or in a combination of a processor and dedicated hardware, such as a processor executing software within a heterogeneous parallel computing system that includes other individual components. In order to encompass the alternative configurations enabled in the various embodiments, the hardware implementing the method 600 is referred to herein as a "controller."

The operations of the method 600 implement some embodiments of the operations performed in block 404 of the method 400 of FIG. 4. Thus, with reference to FIGS. 1-6, the controller may begin performing operations of the method 600 in response to determining a joint goal, such as a joint power and performance goal, for a computational work construct including work components to be distributed for execution by a plurality of heterogeneous processing devices in block 402 of the method 400.

In block 602, the controller may monitor a progress of each of the plurality of heterogeneous processing devices in executing the computational work construct at a time interval ($\Delta t$). In various embodiments, the controller may monitor the progress (m) of each heterogeneous processing device in executing the total work components (M) that are included in the computational work construct at a time interval ($\Delta t$). Based on the progress (m) of each heterogeneous processing device, the controller may linearly extrapolate the remaining computation time ($t_d$) and remaining power consumption ($p_d$) for each heterogeneous processing device at the current power state configuration. For example, the remaining computation time ($t_d$) after a first progress interval ($m_1$) may be determined as follows:

$$t_d = \frac{\Delta t(M - m_1)}{m_1}.$$

In block 604, the controller may determine two or more possible construct power states (G') based at least in part on a first prediction function ($\alpha$), a second prediction function ($\beta$), and the progress of each of the plurality of heterogeneous processing devices in executing the computational work construct at the time interval ($\Delta t$). In various embodiments, the operations of block 602 to determine the two or more possible construct power states (G') may be performed at runtime for the computational work construct.

The first prediction function ($\alpha$) and the second prediction function ($\beta$) may be any type of functions, such as linear functions, non-linear functions, machine learning functions, etc. For example, the first prediction function ($\alpha$) may calculate a predicted remaining execution time ($t'_d$) for a device at a possible power state ($g'_d$) as follows:

$$\alpha(g_d, t_d, g'_d) \rightarrow t'_d.$$

For example, the second prediction function ($\beta$) may calculate a predicted remaining power consumption ($p'_d$) for a device at a possible power state ($g'_d$) as follows:

$$\beta(g_d, p_d, g'_d) \rightarrow p'_d.$$

The two or more possible construct power states (G') may be controlled by the overall remaining execution time ($T^{new}$) that may be the maximum remaining execution time ($t'_d$) of the slowest heterogeneous processing device. For example, the overall remaining execution time ($T^{new}$) may be calculated for a plurality of heterogeneous processing devices ($d_0, d_1, \ldots d_n$) as follows:

$$T^{new} = \max\{t'_0, t'_1, \ldots t'_n\}.$$

The two or more possible construct power states (G') may be controlled by the remaining power consumption ($p^{new}$) that may be the sum of the remaining power consumptions ($p'_d$) for the heterogeneous processing devices. For example, the remaining power consumption ($p^{new}$) may be calculated for a plurality of heterogeneous processing devices ($d_0, d_1, \ldots d_n$) as follows:

$$p^{new} = \Sigma_{i=0}^{n} p'_i.$$

In block 504, the controller may determine a utility for each of the two or more possible construct power states (G') based at least in part on the joint goal (X:Y). For the example of a joint power and performance goal, the utility (U) for a possible construct power state (G') may be found as follows:

$$U(G, G') = \frac{\text{Perf Improvement}}{X} + \frac{\text{Power Improvement}}{Y}$$

where perf improvement =

$$\frac{T^{new} - T^{old}}{T^{old}} \text{ and power improvement} = \frac{p^{old} - p^{new}}{p^{old}}.$$

In block 506, in the example of a joint power and performance goal, the controller may select one of the two or more possible construct power states associated with a maximum determined utility as the construct power state. In response to selecting the construct power state, the controller may return to performing the operations of block 406 of the method 400 (FIG. 4).

Figure 7:
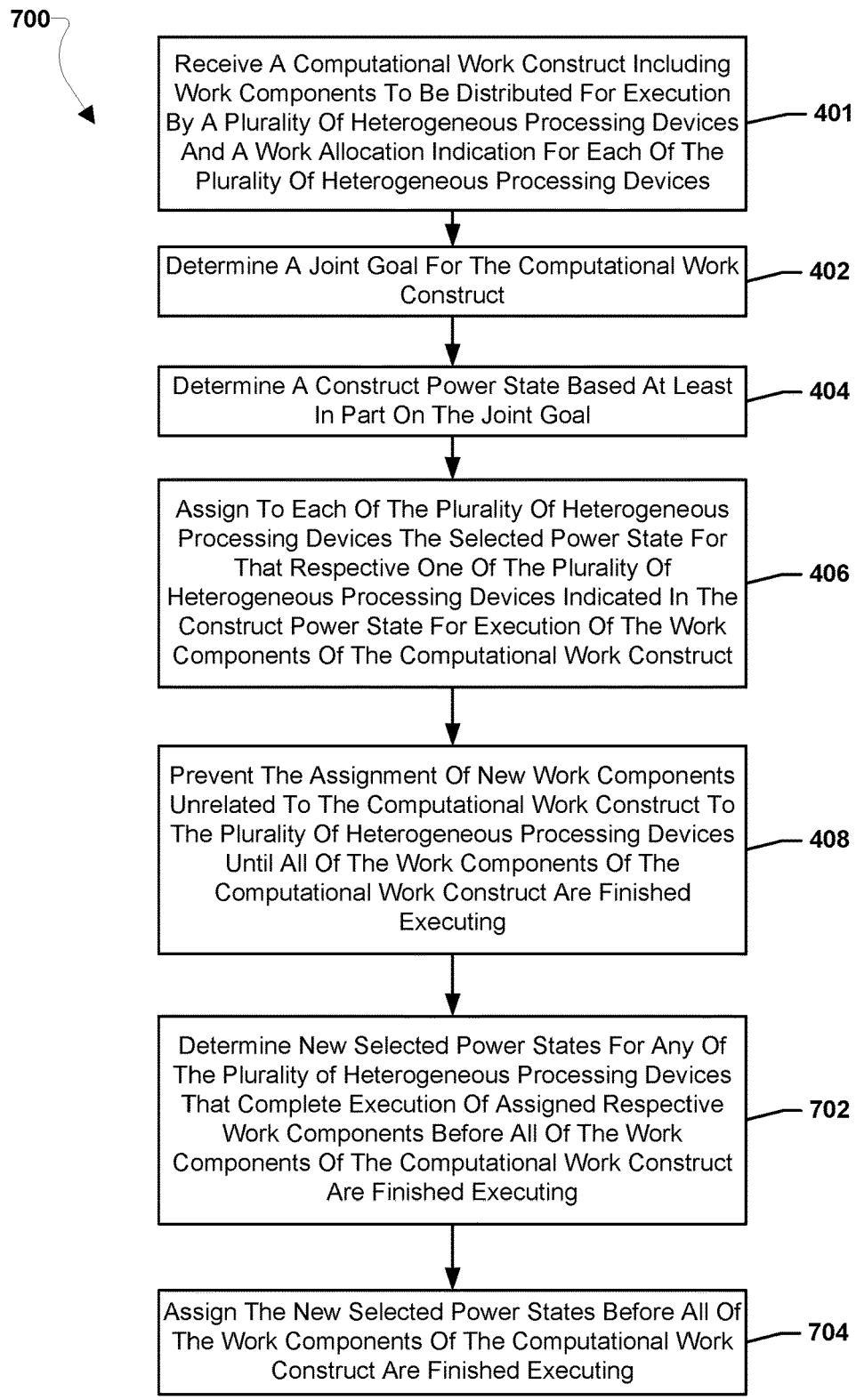
FIG. 7 is a process flow diagram illustrating a method for heterogeneous parallel computing according to an embodiment.

FIG. 7 illustrates a method 700 for heterogeneous parallel computing according to an embodiment. The method 700 may be implemented in a computing device in software executing in a processor (e.g., the processor 14 in FIGS. 1 and 2), in general purpose hardware, in dedicated hardware (e.g., the construct controller 304a, 304b, 304c, 304d in FIGS. 3A-3C), or in a combination of a processor and dedicated hardware, such as a processor executing software within a heterogeneous parallel computing system that includes other individual components. In order to encompass the alternative configurations enabled in the various embodiments, the hardware implementing the method 700 is referred to herein as a "controller."

With reference to FIGS. 1-7, method 700 may begin with the controller performing operations of like numbered blocks 401, 402, 404, 406, and 408 described with reference to methods 400, 500, and 600.

In block 702, the controller may determine new selected power states for any of the plurality of heterogeneous processing devices that complete execution of respective assigned work components before all of the work components of the computational work construct are finished executing. For example, the construct controller may determine a new selected power state for a heterogeneous processing device that completes all assigned work components before other heterogeneous processing devices are finished executing the computational work construct. The new selected power state may enable additional power, energy, and/or thermal savings, and may further enable the joint goal for the computational work construct to be met.

In block 704, the controller may assign the new selected power states before all of the work components of the computational work construct are finished executing. In this manner, heterogeneous processing devices that complete execution ahead of other heterogeneous processing devices may be assigned new selected power states while the other heterogeneous processing devices complete execution of any remaining work components of the computational work construct.

Figure 8:
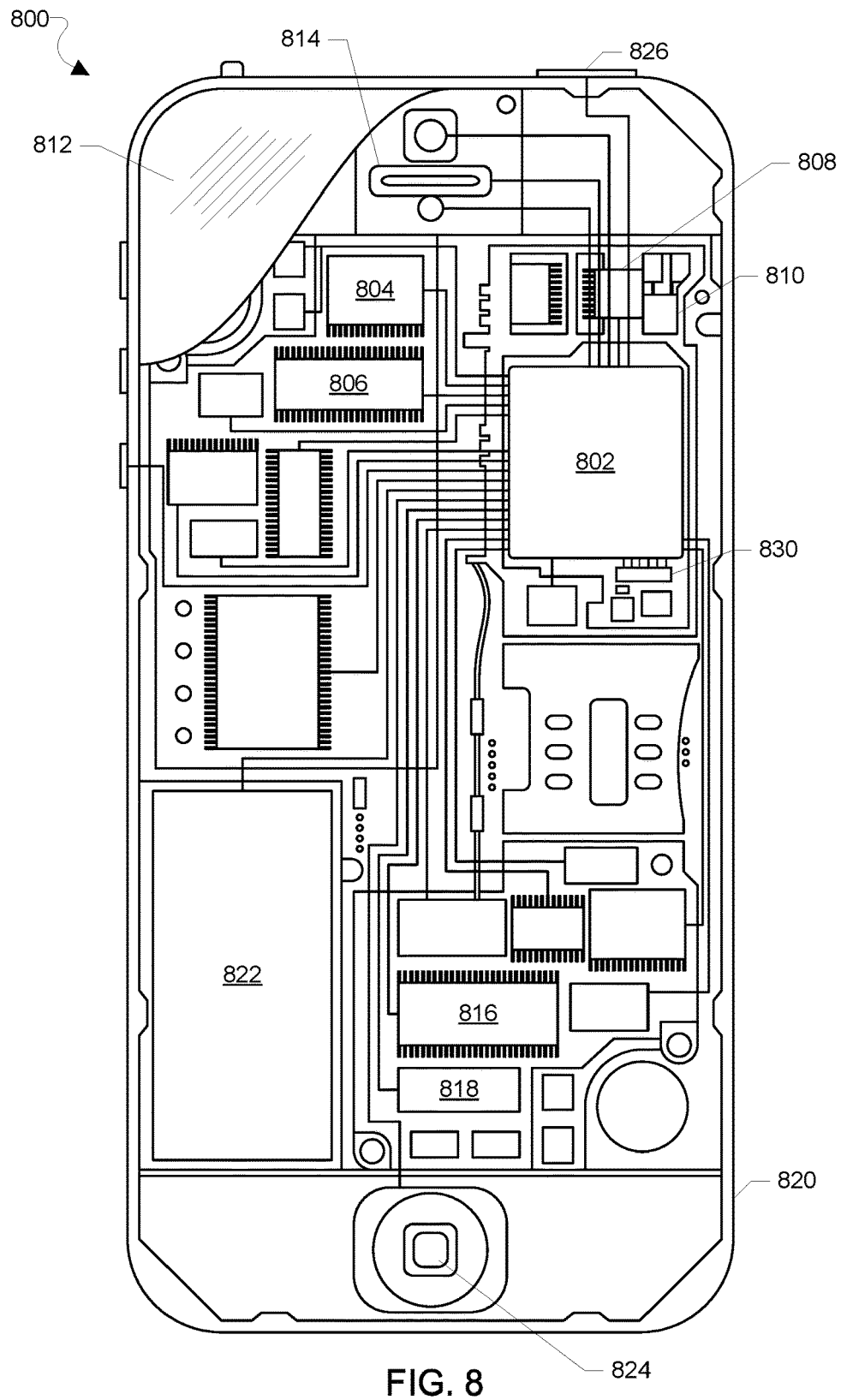
FIG. 8 is a component block diagram illustrating an example mobile computing device suitable for use with the various embodiments.

The various embodiments (including, but not limited to, embodiments described above with reference to FIGS. 1-7) may be implemented in a wide variety of computing systems including mobile computing devices, an example of which suitable for use with the various embodiments is illustrated in FIG. 8. The mobile computing device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the computing device 800 need not have touch screen capability.

The mobile computing device 800 may also include one or more hardware components 830 coupled to the processor 802 and configured to perform functions and operations of the various embodiments. In some embodiments, such hardware components 830 may be a construct controller (e.g., the construct controller 304a, 304b, 304c, 304d, in FIGS. 3A-3C). In some embodiments, such hardware components 830 may operate in conjunctions with the processor 802 to perform functions and operations of the various embodiments that are not performed by the processor 802.

The mobile computing device 800 may have one or more radio signal transceivers 808 (e.g., Peanut, Bluetooth, Zigbee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as Universal Serial Bus (USB), FireWire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components described herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

Figure 9:
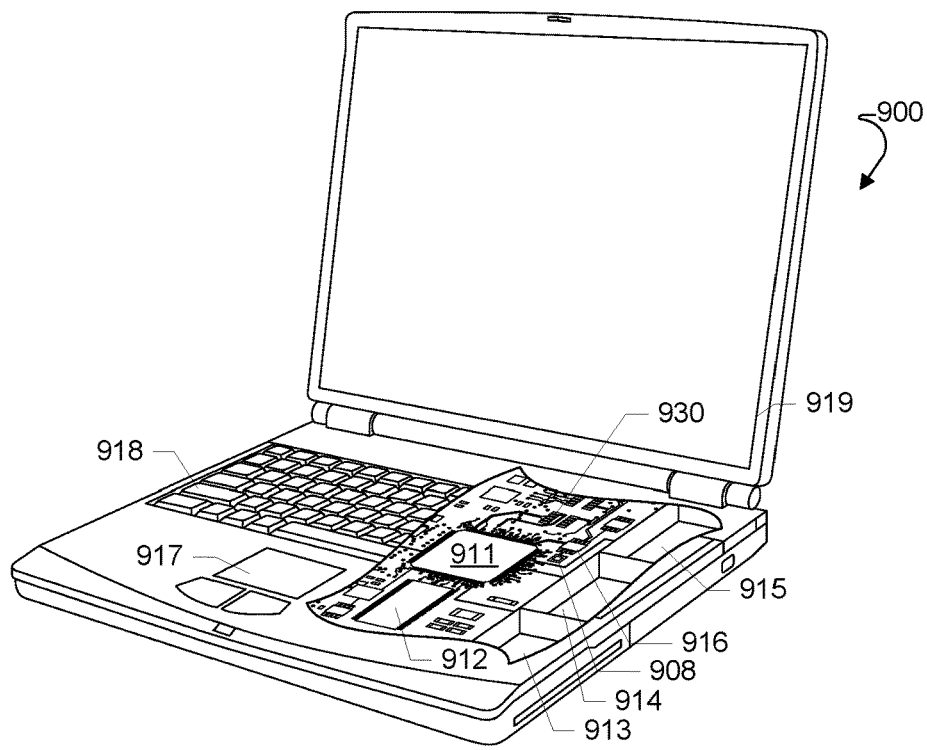
FIG. 9 is a component block diagram illustrating an example mobile computing device suitable for use with the various embodiments.

The various embodiments (including, but not limited to, embodiments described above with reference to FIGS. 1-7) may be implemented in a wide variety of computing systems include a laptop computer 900 an example of which is illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 911 coupled to volatile memory 912 and a large capacity non-volatile memory, such as a disk drive 913 of Flash memory.

The computer 900 may also include one or more hardware components 930 coupled to the processor 911 and configured to perform functions and operations of the various embodiments. In some embodiments, such hardware components 930 may be a construct controller (e.g., the construct controller 304a, 304b, 304c, 304d, in FIGS. 3A-3C). In some embodiments, such hardware components 930 may operate in conjunctions with the processor 802 to perform functions and operations of the various embodiments that are not performed by the processor 911.

Additionally, the computer 900 may have one or more antenna 908 for sending and receiving electromagnetic radiation that may be connected to a wireless data link and/or cellular telephone transceiver 916 coupled to the processor 911. The computer 900 may also include a floppy disc drive 914 and a compact disc (CD) drive 915 coupled to the processor 911. In a notebook configuration, the computer housing includes the touchpad 917, the keyboard 918, and the display 919 all coupled to the processor 911. Other configurations of the computing device may include a computer mouse or trackball coupled to the processor (e.g., via a USB input) as are well known, which may also be used in conjunction with the various embodiments.

Figure 10:
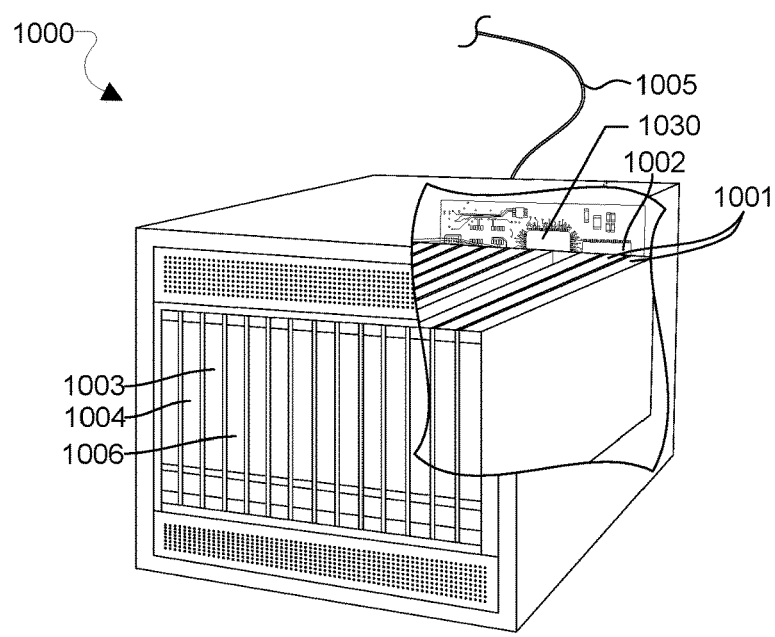
FIG. 10 is a component block diagram illustrating an example server suitable for use with the various embodiments.

The various embodiments (including, but not limited to, embodiments described above with reference to FIGS. 1-7) may also be implemented in fixed computing systems, such as any of a variety of commercially available servers. An example server 1000 is illustrated in FIG. 10. Such a server 1000 typically includes one or more multi-core processor assemblies 1001 coupled to volatile memory 1002 and a large capacity nonvolatile memory, such as a disk drive 1004. As illustrated in FIG. 10, multi-core processor assemblies 1001 may be added to the server 1000 by inserting them into the racks of the assembly. The server 1000 may also include a floppy disc drive, compact disc (CD) or digital versatile disc (DVD) disc drive 1006 coupled to the processor 1001. The server 1000 may also include one or more hardware components 1030 coupled to the processor 1001 and configured to perform functions and operations of the various embodiments. In some embodiments, such hardware components 1030 may be a construct controller (e.g., the construct controller 304a, 304b, 304c, 304d, in FIGS. 3A-3C). In some embodiments, such hardware components 1030 may operate in conjunctions with the processor 1001 to perform functions and operations of the various embodiments that are not performed by the processor 1001.

The server 1000 may also include network access ports 1003 coupled to the multi-core processor assemblies 1001 for establishing network interface connections with a network 1005, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the various embodiments. Various modifications to these embodiments will be readily apparent to those skilled in the art, and the generic principles defined herein may be applied to some embodiments without departing from the scope of the claims. Thus, the present disclosure is not intended to be limited to the examples shown herein but is to be accorded the widest scope consistent with the following claims and the principles and novel features disclosed herein.

What is claimed is:

1. A method of managing heterogeneous parallel computing, comprising:
   determining, by a controller, a joint goal for a computational work construct;
   determining, by the controller at runtime for the computational work construct, a construct power state based at least in part on the joint goal, wherein the construct power state indicates a selected power state for each of a plurality of heterogeneous processing devices;
   assigning to each of the plurality of heterogeneous processing devices, by the controller, the selected power state for that respective one of the plurality of heterogeneous processing devices indicated in the construct power state for execution of work components; and
   preventing, by the controller, the assignment of new work components unrelated to the computational work construct to the plurality of heterogeneous processing devices until all of the work components of the computational work construct are finished executing.

2. The method of claim 1, further comprising receiving, in the controller, the computational work construct, wherein the computational work construct comprises the work components to be distributed for execution by the plurality of heterogeneous processing devices and a work allocation indication for each of the plurality of heterogeneous processing devices.

3. The method of claim 1, wherein determining the construct power state based at least in part on the joint goal comprises:
   determining, by the controller at runtime for the computational work construct, two or more possible construct power states based at least in part on a computational history associated with the computational work construct, a first prediction function, and a second prediction function, wherein the possible construct power states indicate predicted power states for each of the plurality of heterogeneous processing devices;
   determining, by the controller, a utility for each of the two or more possible construct power states based at least in part on the joint goal; and
   selecting, by the controller, one of the two or more possible construct power states associated with a maximum determined utility as the construct power state.

4. The method of claim 3, wherein the first prediction function calculates performance improvement and the second prediction function calculates power improvement.

5. The method of claim 1, further comprising:
   determining, by the controller, new selected power states for any of the plurality of heterogeneous processing devices that complete execution of respective assigned work components before all of the work components of the computational work construct are finished executing; and
   assigning, by the controller, the new selected power states before all of the work components of the computational work construct are finished executing.

6. The method of claim 1, wherein determining the construct power state based at least in part on the joint goal comprises:
   monitoring, by the controller, a progress of each of the plurality of heterogeneous processing devices in executing the computational work construct at a time interval;
   determining, by the controller, two or more possible construct power states based at least in part on a first prediction function, a second prediction function, and the progress of each of the plurality of heterogeneous processing devices in executing the computational work construct at the time interval;
   determining, by the controller, a utility for each of the two or more possible construct power states based at least in part on the joint goal; and
   selecting, by the controller, one of the two or more possible construct power states associated with a maximum determined utility as the construct power state.

7. The method of claim 6, wherein the two or more possible power construct states are further based on a maximum remaining computation time of the plurality of heterogeneous processing devices in executing the computational work construct and a sum of remaining power consumptions of the plurality of heterogeneous processing devices in executing the computational work construct.

8. The method of claim 6, wherein the first prediction function calculates remaining execution time and the second prediction function calculates predicted power consumption.

9. The method of claim 1, wherein the joint goal is a power and performance goal comprising a ratio of a performance goal state to a power goal state.

10. The method of claim 1, wherein the joint goal indicates at least one of a power state, a thermal state, a battery state, a memory performance state, and a frequency state.

11. The method of claim 1, wherein the computational work construct indicates a time for executing the computational work construct.

12. A computing device, comprising:
   a plurality of heterogeneous processing devices; and
   a controller configured to perform operations comprising:
      determining a joint goal for a computational work construct;
      determining, at runtime for the computational work construct, a construct power state based at least in part on the joint goal, wherein the construct power state indicates a selected power state for each of the plurality of heterogeneous processing devices;
      assigning to each of the plurality of heterogeneous processing devices the selected power state for that respective one of the plurality of heterogeneous processing devices indicated in the construct power state for execution of work components; and
      preventing assignment of new work components unrelated to the computational work construct to the plurality of heterogeneous processing devices until all of the work components of the computational work construct are finished executing.

13. The computing device of claim 12, wherein the controller is configured to perform operations further comprising:
   receiving the computational work construct, wherein the computational work construct comprises the work components to be distributed for execution by the plurality of heterogeneous processing devices and a work allocation indication for each of the plurality of heterogeneous processing devices.

14. The computing device of claim 12, wherein the controller is configured to perform operations such that determining the construct power state based at least in part on the joint goal comprises:
   determining, at runtime for the computational work construct, two or more possible construct power states based at least in part on a computational history associated with the computational work construct, a first prediction function, and a second prediction function, wherein the possible construct power states indicate predicted power states for each of the plurality of heterogeneous processing devices;

determining a utility for each of the two or more possible construct power states based at least in part on the joint goal; and selecting one of the two or more possible construct power states associated with a maximum determined utility as the construct power state.

15. The computing device of claim 14, wherein the controller is configured to perform operations such that the first prediction function calculates performance improvement and the second prediction function calculates power improvement.

16. The computing device of claim 12, wherein the controller is configured to perform operations further comprising:

determining new selected power states for any of the plurality of heterogeneous processing devices that complete execution of respective assigned work components before all of the work components of the computational work construct are finished executing; and assigning the new selected power states before all of the work components of the computational work construct are finished executing.

17. The computing device of claim 12, wherein the controller is configured to perform operations such that determining the construct power state based at least in part on the joint goal comprises:

monitoring a progress of each of the plurality of heterogeneous processing devices in executing the computational work construct at a time interval;

determining two or more possible construct power states based at least in part on a first prediction function, a second prediction function, and the progress of each of the plurality of heterogeneous processing devices in executing the computational work construct at the time interval;

determining a utility for each of the two or more possible construct power states based at least in part on the joint goal; and selecting one of the two or more possible construct power states associated with a maximum determined utility as the construct power state.

18. The computing device of claim 17, wherein the controller is configured to perform operations such that the two or more possible power construct states are further based on a maximum remaining computation time of the plurality of heterogeneous processing devices in executing the computational work construct and a sum of remaining power consumptions of the plurality of heterogeneous processing devices in executing the computational work construct.

19. The computing device of claim 17, wherein the controller is configured to perform operations such that the first prediction function calculates remaining execution time and the second prediction function calculates predicted power consumption.

20. The computing device of claim 12, wherein the controller is configured to perform operations such that the joint goal is a power and performance goal comprising a ratio of a performance goal state to a power goal state.

21. The computing device of claim 12, wherein the controller is configured to perform operations such that the joint goal indicates at least one of a power state, a thermal state, a battery state, a memory performance state, and a frequency state.

22. The computing device of claim 12, wherein the controller is configured to perform operations such that the computational work construct indicates a time for executing the computational work construct.

23. A computing device, comprising:

a plurality of heterogeneous processing devices;

means for determining a joint goal for a computational work construct;

means for determining, at runtime for the computational work construct, a construct power state based at least in part on the joint goal, wherein the construct power state indicates a selected power state for each of the plurality of heterogeneous processing devices;

means for assigning to each of the plurality of heterogeneous processing devices the selected power state for that respective one of the plurality of heterogeneous processing devices indicated in the construct power state for execution of work components; and means for preventing assignment of new work components unrelated to the computational work construct to the plurality of heterogeneous processing devices until all of the work components of the computational work construct are finished executing.

24. The computing device of claim 23, further comprising:

means for receiving the computational work construct, wherein the computational work construct comprises the work components to be distributed for execution by the plurality of heterogeneous processing devices and a work allocation indication for each of the plurality of heterogeneous processing devices.

25. The computing device of claim 23, wherein means for determining the construct power state based at least in part on the joint goal comprises:

means for determining, at runtime for the computational work construct, two or more possible construct power states based at least in part on a computational history associated with the computational work construct, a first prediction function, and a second prediction function, wherein the possible construct power states indicate predicted power states for each of the plurality of heterogeneous processing devices;

means for determining a utility for each of the two or more possible construct power states based at least in part on the joint goal; and means for selecting one of the two or more possible construct power states associated with a maximum determined utility as the construct power state.

26. The computing device of claim 25, wherein the first prediction function calculates performance improvement and the second prediction function calculates power improvement.

27. The computing device of claim 23, further comprising:

means for determining new selected power states for any of the plurality of heterogeneous processing devices that complete execution of respective assigned work components before all of the work components of the computational work construct are finished executing; and means for assigning the new selected power states before all of the work components of the computational work construct are finished executing.

28. The computing device of claim 23, wherein means for determining the construct power state based at least in part on the joint goal comprises:

means for monitoring a progress of each of the plurality of heterogeneous processing devices in executing the computational work construct at a time interval;

means for determining two or more possible construct power states based at least in part on a first prediction function, a second prediction function, and the progress of each of the plurality of heterogeneous processing devices in executing the computational work construct at the time interval;

means for determining a utility for each of the two or more possible construct power states based at least in part on the joint goal; and means for selecting one of the two or more possible construct power states associated with a maximum determined utility as the construct power state.

29. The computing device of claim 28, wherein the two or more possible power construct states are further based on a maximum remaining computation time of the plurality of heterogeneous processing devices in executing the computational work construct and a sum of remaining power consumptions of the plurality of heterogeneous processing devices in executing the computational work construct.

30. The computing device of claim 28, wherein the first prediction function calculates remaining execution time and the second prediction function calculates predicted power consumption.

31. The computing device of claim 23, wherein the joint goal is a power and performance goal comprising a ratio of a performance goal state to a power goal state.

32. The computing device of claim 23, wherein the joint goal indicates at least one of a power state, a thermal state, a battery state, a memory performance state, and a frequency state.

33. The computing device of claim 23, wherein the computational work construct indicates a time for executing the computational work construct.

34. A non-transitory processor readable medium having stored thereon processor executable instructions configured to cause a processor of a computing device to perform operations comprising:

determining a joint goal for a computational work construct;

determining, at runtime for the computational work construct, a construct power state based at least in part on the joint goal, wherein the construct power state indicates a selected power state for each of a plurality of heterogeneous processing devices;

assigning to each of the plurality of heterogeneous processing devices the selected power state for that respective one of the plurality of heterogeneous processing devices indicated in the construct power state for execution of work components; and preventing assignment of new work components unrelated to the computational work construct to the plurality of heterogeneous processing devices until all of the work components of the computational work construct are finished executing.

35. The non-transitory processor readable medium of claim 34, wherein the stored processor executable instructions are configured to cause a processor of a computing device to perform operations further comprising:

receiving the computational work construct, wherein the computational work construct comprises the work components to be distributed for execution by the plurality of heterogeneous processing devices and a work allocation indication for each of the plurality of heterogeneous processing devices.

36. The non-transitory processor readable medium of claim 34, wherein the stored processor executable instructions are configured to cause a processor of a computing device to perform operations such that determining the construct power state based at least in part on the joint goal comprises:

determining, at runtime for the computational work construct, two or more possible construct power states based at least in part on a computational history associated with the computational work construct, a first prediction function, and a second prediction function, wherein the possible construct power states indicate predicted power states for each of the plurality of heterogeneous processing devices;

determining a utility for each of the two or more possible construct power states based at least in part on the joint goal; and selecting one of the two or more possible construct power states associated with a maximum determined utility as the construct power state.

37. The non-transitory processor readable medium of claim 36, wherein the stored processor executable instructions are configured to cause a processor of a computing device to perform operations such that the first prediction function calculates performance improvement and the second prediction function calculates power improvement.

38. The non-transitory processor readable medium of claim 34, wherein the stored processor executable instructions are configured to cause a processor of a computing device to perform operations further comprising:

determining new selected power states for any of the plurality of heterogeneous processing devices that complete execution of respective assigned work components before all of the work components of the computational work construct are finished executing; and assigning the new selected power states before all of the work components of the computational work construct are finished executing.

39. The non-transitory processor readable medium of claim 34, wherein the stored processor executable instructions are configured to cause a processor of a computing device to perform operations such that determining the construct power state based at least in part on the joint goal comprises:

monitoring a progress of each of the plurality of heterogeneous processing devices in executing the computational work construct at a time interval;

determining two or more possible construct power states based at least in part on a first prediction function, a second prediction function, and the progress of each of the plurality of heterogeneous processing devices in executing the computational work construct at the time interval;

determining a utility for each of the two or more possible construct power states based at least in part on the joint goal; and selecting one of the two or more possible construct power states associated with a maximum determined utility as the construct power state.

40. The non-transitory processor readable medium of claim 39, wherein the stored processor executable instructions are configured to cause a processor of a computing device to perform operations such that the two or more possible power construct states are further based on a maximum remaining computation time of the plurality of heterogeneous processing devices in executing the computational work construct and a sum of remaining power consumptions of the plurality of heterogeneous processing devices in executing the computational work construct.

41. The non-transitory processor readable medium of claim 39, wherein the stored processor executable instructions are configured to cause a processor of a computing device to perform operations such that the first prediction function calculates remaining execution time and the second prediction function calculates predicted power consumption.

42. The non-transitory processor readable medium of claim 34, wherein the stored processor executable instructions are configured to cause a processor of a computing device to perform operations such that the joint goal is a power and performance goal comprising a ratio of a performance goal state to a power goal state.

43. The non-transitory processor readable medium of claim 34, wherein the stored processor executable instructions are configured to cause a processor of a computing device to perform operations such that the joint goal indicates at least one of a power state, a thermal state, a battery state, a memory performance state, and a frequency state.

44. The non-transitory processor readable medium of claim 34, wherein the stored processor executable instructions are configured to cause a processor of a computing device to perform operations such that the computational work construct indicates a time for executing the computational work construct.

* * * * *